(12) United States Patent
Cheng

(10) Patent No.: US 10,626,792 B2
(45) Date of Patent: Apr. 21, 2020

(54) HIGH-PERFORMANCE INTERNAL COMBUSTION ENGINE

(71) Applicant: Chia-Chun Cheng, New Taipei (TW)

(72) Inventor: Chia-Chun Cheng, New Taipei (TW)

(*) Notice: Subject to any disclaimer, the term of this patent is extended or adjusted under 35 U.S.C. 154(b) by 63 days.

(21) Appl. No.: 16/165,246

(22) Filed: Oct. 19, 2018

(65) Prior Publication Data

US 2019/0120136 A1   Apr. 25, 2019

(30) Foreign Application Priority Data

Oct. 19, 2017  (TW) .............................. 106215377 U

(51) Int. Cl.
| | | |
|---|---|---|
| F02B 75/24 | (2006.01) | |
| F02B 75/18 | (2006.01) | |
| F01M 3/00 | (2006.01) | |
| F02F 1/00 | (2006.01) | |
| F02B 33/28 | (2006.01) | |
| F01M 1/04 | (2006.01) | |
| F02B 33/04 | (2006.01) | |
| F01B 1/08 | (2006.01) | |
| F02F 7/00 | (2006.01) | |
| F02M 35/10 | (2006.01) | |
| F02B 75/02 | (2006.01) | |

(52) U.S. Cl.
CPC .............. *F02B 75/24* (2013.01); *F01B 1/08* (2013.01); *F01M 1/04* (2013.01); *F01M 3/00* (2013.01); *F02B 33/04* (2013.01); *F02B 33/28* (2013.01); *F02B 75/1896* (2013.01); *F02F 1/00* (2013.01); *F02F 7/0009* (2013.01); *F02M 35/10255* (2013.01); *F02B 2075/025* (2013.01)

(58) Field of Classification Search
CPC .......... F02B 75/24; F02B 33/04; F02B 33/28; F02B 2075/025; F02B 75/1896; F01B 1/08; F01M 1/04; F01M 3/00; F02F 1/00; F02F 7/0009; F02F 35/10255
See application file for complete search history.

(56) References Cited

U.S. PATENT DOCUMENTS 1,984,862 A * 12/1934 Bucklen .................. F01L 7/021
                                              123/47 A
4,449,488 A *  5/1984 Heaton .................... F01B 9/047
                                              123/46 R
(Continued)

*Primary Examiner* — Syed O Hasan
(74) *Attorney, Agent, or Firm* — Chun-Ming Shih; HDLS IPR Services

(57) ABSTRACT

A high-performance internal combustion engine includes: a crankshaft chamber; at least two cylinder chambers; a crankshaft linkage mechanism, disposed in the crankshaft chamber; at least two pistons, connected to the crankshaft linkage mechanism and accommodated in the cylinder chambers; an inlet pipe, only communicated with the crankshaft chamber; at least two flow guiding pipes, having one end thereof only communicated with the crankshaft chamber and another end thereof only communicated with the cylinder chamber; and a check valve unit, including a check valve disposed at a connecting location of the inlet pipe and the crankshaft chamber, and two first switch valves disposed at connecting locations of the flow guiding pipes and the cylinder chambers. Accordingly, the working efficiency of the high-performance internal combustion engine can be increased.

6 Claims, 5 Drawing Sheets

(56) References Cited

U.S. PATENT DOCUMENTS

| | | | | |
|---|---|---|---|---|
| 4,972,809 A | * | 11/1990 | Hirasawa | B63H 20/245 |
| | | | | 123/195 HC |
| 5,799,628 A | * | 9/1998 | Lacerda | F01B 9/023 |
| | | | | 123/52.3 |
| 6,318,320 B1 | * | 11/2001 | Tosaka | F01L 1/024 |
| | | | | 123/195 HC |

* cited by examiner

… (US 10,626,792 B2)

HIGH-PERFORMANCE INTERNAL COMBUSTION ENGINE

BACKGROUND OF THE INVENTION

Field of the Invention

The present invention relates to an internal combustion engine structure, especially to a high-performance internal combustion engine.

Description of Related Art

In an internal combustion engine (ICE), an inlet pipe is served to introduce external air into a combustion chamber, then a combustion fuel is provided and mixed with the air in the combustion chamber for the purpose of combustion and explosion, the air is expanded due to the heat, and a mechanical device is utilized for converting the energy generated from the combustion into a mechanical energy for providing operating power to the exterior, so that the chemical energy of the combustion fuel can be converted into the mechanical energy. At present, the actuation principle adopting the internal combustion engine is widely applied in various fields, for example a vehicle, a boat or an aircraft.

Wherein, a reciprocal piston type internal combustion engine has four processes which are air inlet, compression, providing operating power and exhaust; a four-stroke cycle is defined by the above-mention processes of air inlet, compression, providing operating power and exhaust being achieved via four strokes (a piston being displaced from one end of the cylinder to another end thereof), and an at-least-two-stroke cycle is defined by the above-mentioned processes of air inlet, compression, providing operating power and exhaust being achieved via at least two strokes.

However, with the same exhaust amount, the power generated by the four-stroke cycle internal combustion engine is only about half of the power generated by the at-least-two-stroke cycle internal combustion engine; because the exhaust process and the air inlet process are separated in the four-stroke cycle internal combustion engine, the air, which is yet to be combusted, can be prevented from being exhausted to the exterior, thus the four-stroke cycle internal combustion engine has advantages of wasting less combustion fuel, generating less air pollutions and satisfying the requirements of green energy and environmental protection. As such, how to increasing the power efficiency of the four-stroke cycle internal combustion engine shall be seriously concerned by the skilled people in the art.

Accordingly, the applicant of the present invention has devoted himself for improving the mentioned disadvantages.

SUMMARY OF THE INVENTION

The present invention is to provide a high-performance internal combustion engine, in which an air intake amount of two cylinder chambers can be filled inside one of the cylinder chambers when a crankshaft chamber is fully compressed, so that a greater combustion force can be generated during a combustion stroke of the cylinder chamber, thereby increasing the power efficiency of the high-performance internal combustion engine.

Accordingly, the present invention provides a high-performance internal combustion engine, which includes: a crankshaft chamber; at least two cylinder chambers; a crankshaft linkage mechanism, disposed in the crankshaft chamber; at least two pistons, connected to the crankshaft linkage mechanism and accommodated in the cylinder chambers; an inlet pipe, only communicated with the crankshaft chamber; at least two flow guiding pipes, having one end thereof only communicated with the crankshaft chamber and another end thereof only communicated with the cylinder chamber; and a check valve unit, including a check valve disposed at a connecting location of the inlet pipe and the crankshaft chamber, and at least two first switch valves disposed at connecting locations of the flow guiding pipes and the cylinder chambers.

Based on what has been disclosed above, the inlet pipe is only communicated with the crankshaft chamber, one end of the flow guiding pipe is only communicated with the crankshaft chamber and another end thereof is only communicated with the cylinder chamber, and the inlet pipe is connected to an upper part of the crankshaft chamber, the two flow guiding pipes are connected to a lower part of the crankshaft chamber; combustion fuel, air and lubrication oil introduced from the inlet pipe have to pass through the crankshaft chamber so as to flow into the two flow guiding pipes, so that the combustion fuel, the air and the lubrication oil can be served to evenly lubricate the crankshaft linkage mechanism then flow into the two flow guiding pipes, thereby enhancing the operation stability of the crankshaft linkage mechanism and prolonging the service life thereof, meanwhile the combustion fuel, the air and the lubrication oil sequentially flow through the inlet pipe, the crankshaft chamber, the flow guiding pipe and the cylinder chamber, so that turbulent flows can be prevented from being generated inside the crankshaft chamber, the flow guiding pipe or the cylinder chamber, and the working efficiency of the high-performance internal combustion engine can be stabilized.

DETAILED DESCRIPTION OF THE INVENTION

Figure 1:
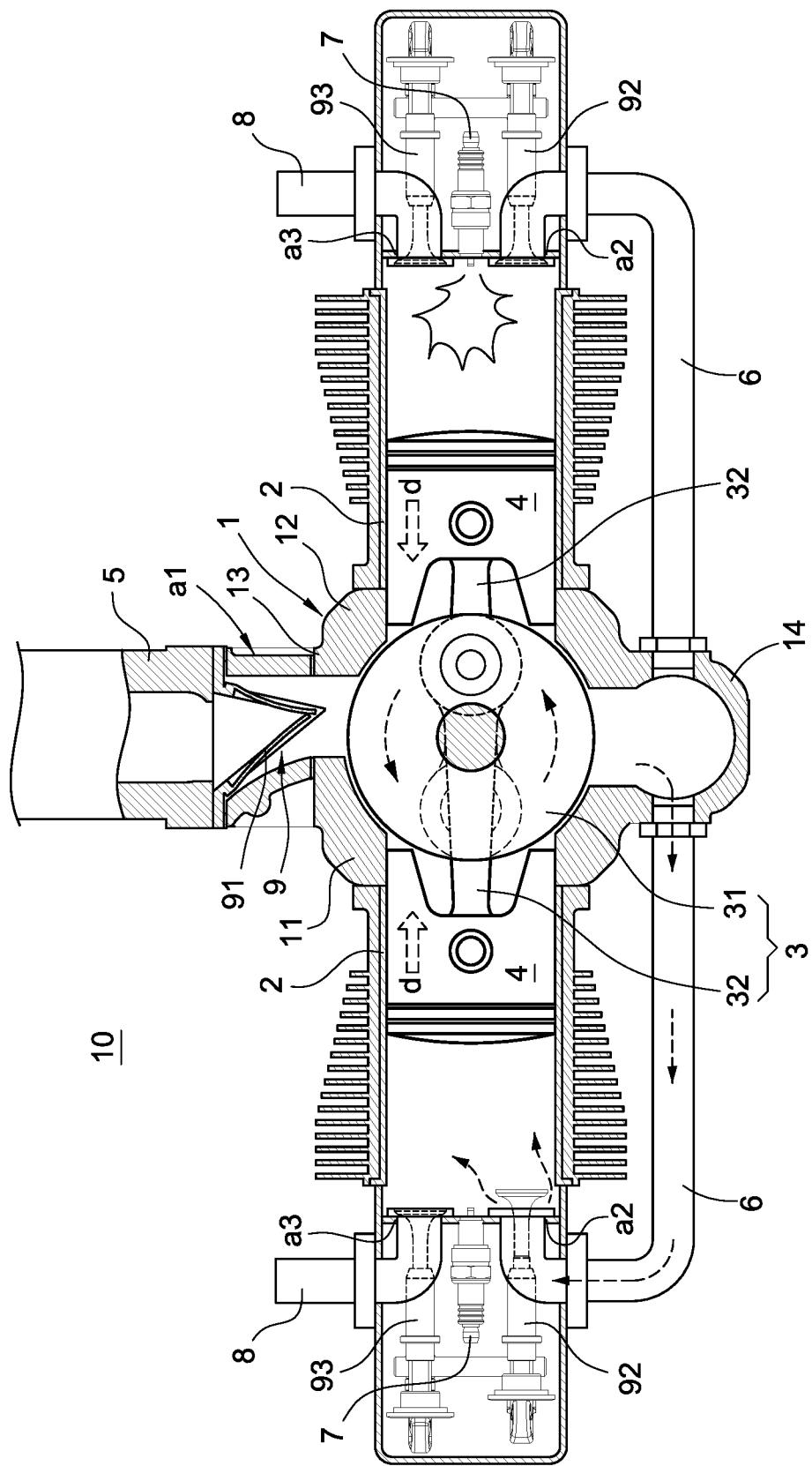
FIG. 1 is a schematic view showing a first operating status of a high-performance internal combustion engine according to one embodiment of the present invention.

Preferred embodiments of the present invention will be described with reference to the drawings.

Please refer from FIG. 1 to FIG. 4. A high-performance internal combustion engine 10 mainly including a crankshaft chamber 1, at least two cylinder chambers 2, a crankshaft linkage mechanism 3, at least two pistons 4, an inlet pipe 5, at least two flow guiding pipes 6, at least two spark plugs 7, at least two exhaust pipes 8 and a check valve unit 9 is disclosed in the present invention.

The crankshaft chamber 1 is formed with a left part 11, a right part 12, an upper part 13 and a lower part 14. Wherein, according to this embodiment, there are two cylinder chambers 2, two pistons 4, two flow guiding pipes 6, two spark plugs 6 and two exhaust pipes 8 adopted in the present invention, but what shall be addressed is that the scope of the present invention is not limited to the amount of the above-mentioned components. One of the cylinder chambers 2 is connected to the left part 11, and the other cylinder 2 is connected to the right part 12.

The crankshaft linkage mechanism 3 is disposed in the crankshaft chamber 1. Details are provided as follows. The crankshaft linkage mechanism 3 includes a crankshaft disk 31 and linkage rods 32 provided with the same amount as the cylinder chambers 2, the crankshaft disk 31 is disposed in the crankshaft chamber 1, and one end of the linkage rod 32 is connected to the crankshaft disk 31 and another end thereof is disposed in the cylinder chamber 2.

The pistons 4 are connected to the crankshaft linkage mechanism 3 and accommodated in the cylinder chambers 2, in other words the pistons 4 are connected to the linkage rods 32 and capable of being reciprocally displaced inside the cylinder chambers 2 with the linkage rods 32. Wherein, the crankshaft chamber 1 and the cylinder chambers 2 are separated by the pistons 4, the two pistons 4 can be together displaced towards directions close to the crankshaft chamber 1 or displaced towards directions away from the crankshaft chamber 1, and displacement directions d of the two pistons 4 are arranged in parallel; what shall be addressed is that the scope of the present invention is not limited to the above-mentioned arrangement, the displacement directions of the two pistons 4 can be arranged in a V-like status or perpendicular to each other.

The inlet pipe 5 is only communicated with the crankshaft chamber 1, one end of the flow guiding pipe 6 is only communicated with the crankshaft chamber 1 and another end thereof is only communicated with the cylinder chamber 2. Details are provided as follows. The inlet pipe 5 is connected to the upper part 13, the two flow guiding pipes 6 are connected to the lower part 14, and the inlet pipe 5 is used for introducing an external mixture of combustion fuel, air, and lubrication oil into the crankshaft chamber 1.

The spark plug 7 is connected to one side, away from the crankshaft chamber 1, of the cylinder chamber 2, and arranged corresponding to the cylinder chamber 2. The exhaust pipe 8 is only communicated with the cylinder chamber 2, and the flow guiding pipe 6 and the exhaust pipe 8 are disposed at two sides of the spark plug 7.

The check valve unit 9 includes a check valve 91, first switch valves 92 and second switch valves 93 provided with the same amount as the cylinder chambers 2, the check valve 91 is disposed at a connecting location a1 of the inlet pipe 5 and the crankshaft chamber 1, the first switch valves 92 are disposed at connecting locations a2 of the flow guiding pipes 6 and the cylinder chambers 2, and the second switch valves 93 are disposed at connecting locations a3 of the exhaust pipes 8 and the cylinder chambers 2.

Details are provided as follows. The check valve 91 is used for guiding a fluid for flowing into the crankshaft chamber 1 from the inlet pipe 5, and the check valve 91 is able to prevent the fluid from flowing from the crankshaft chamber 1 to the inlet pipe 5. The first switch valve 92 is used for opening or closing the communication between the flow guiding pipe 6 and the cylinder chamber 2, and the second switch valve 93 is used for opening or closing the communication between the exhaust pipe 8 and the cylinder chamber 2.

FIG. 1 to FIG. 4 disclose the operating statuses of the high-performance internal combustion engine 10 provided by the present invention. As shown in FIG. 1, the first operating status is that: the spark plug 7 at the right side is ignited for enabling the cylinder chamber 2 at the right side to generate a combustion stroke, the first switch valve 92 and the second switch valve 93 both at the right side are closed during the combustion stroke, and a pressure generated during the combustion is able to apply a pushing force to the pistons 4, so that the two pistons 4 are together displaced towards the directions close to the crankshaft chamber 1, meanwhile an internal air pressure inside the crankshaft chamber 1 is increased so as to close the check valve 91, so that the combustion fuel, the air and the lubrication oil are prevented from flowing from the crankshaft chamber 1 to the inlet pipe 5, lastly the combustion fuel, the air and the lubrication oil are allowed to enter the cylinder chamber 2 at the left side via the first switch valve 92 at the left side for enabling an air intake stroke to be generated.

Figure 2:
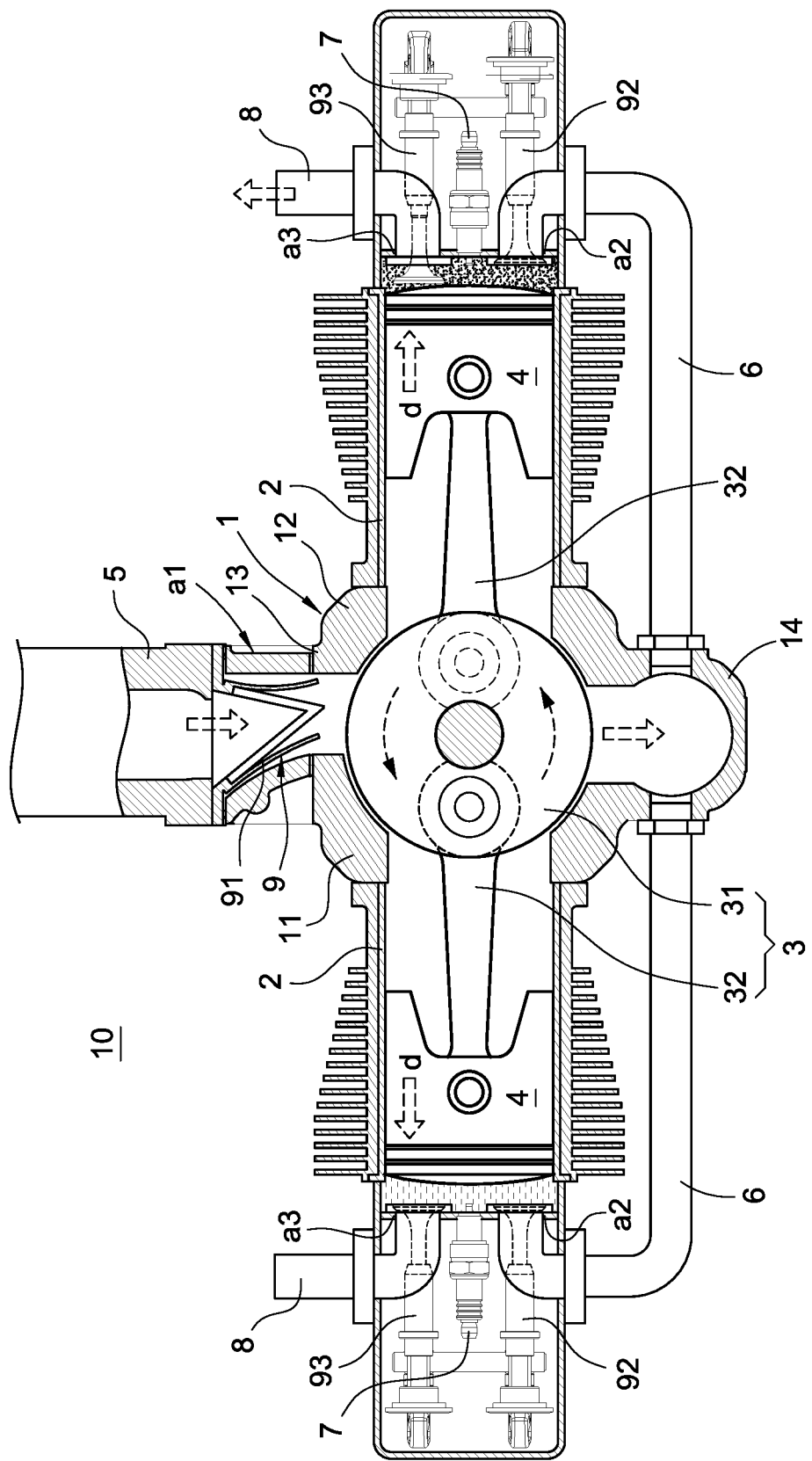
FIG. 2 is a schematic view showing a second operating status of the high-performance internal combustion engine according to one embodiment of the present invention.

As shown in FIG. 2, the second operating status is that: the two pistons 4 are together displaced towards the directions away from the crankshaft chamber 1, so that the internal air pressure inside the crankshaft chamber 1 is decreased so as to open the check valve 91, and the first switch valve 92 and the second switch valve 93 both at the left side are in a closed status, thereby enabling the interior of the cylinder chamber 2 at the left side to be in a sealed status, so when the piston 4 is continuously displaced to compress an internal space of the cylinder chamber 2 at the left side, the combustion fuel, the air and the lubrication oil are pressurized for enabling a pressurizing stroke to be generated; because the first switch valve 92 at the right side is in a closed status and the second switch valve 93 at the right side is in an opened status, waste gas generated during the combustion stroke inside the cylinder chamber 2 at the right side is exhausted from the second switch valve 93 at the right side to the exhaust pipe 8 at the right side thereby enabling an exhaustion stroke to be generated.

Figure 3:
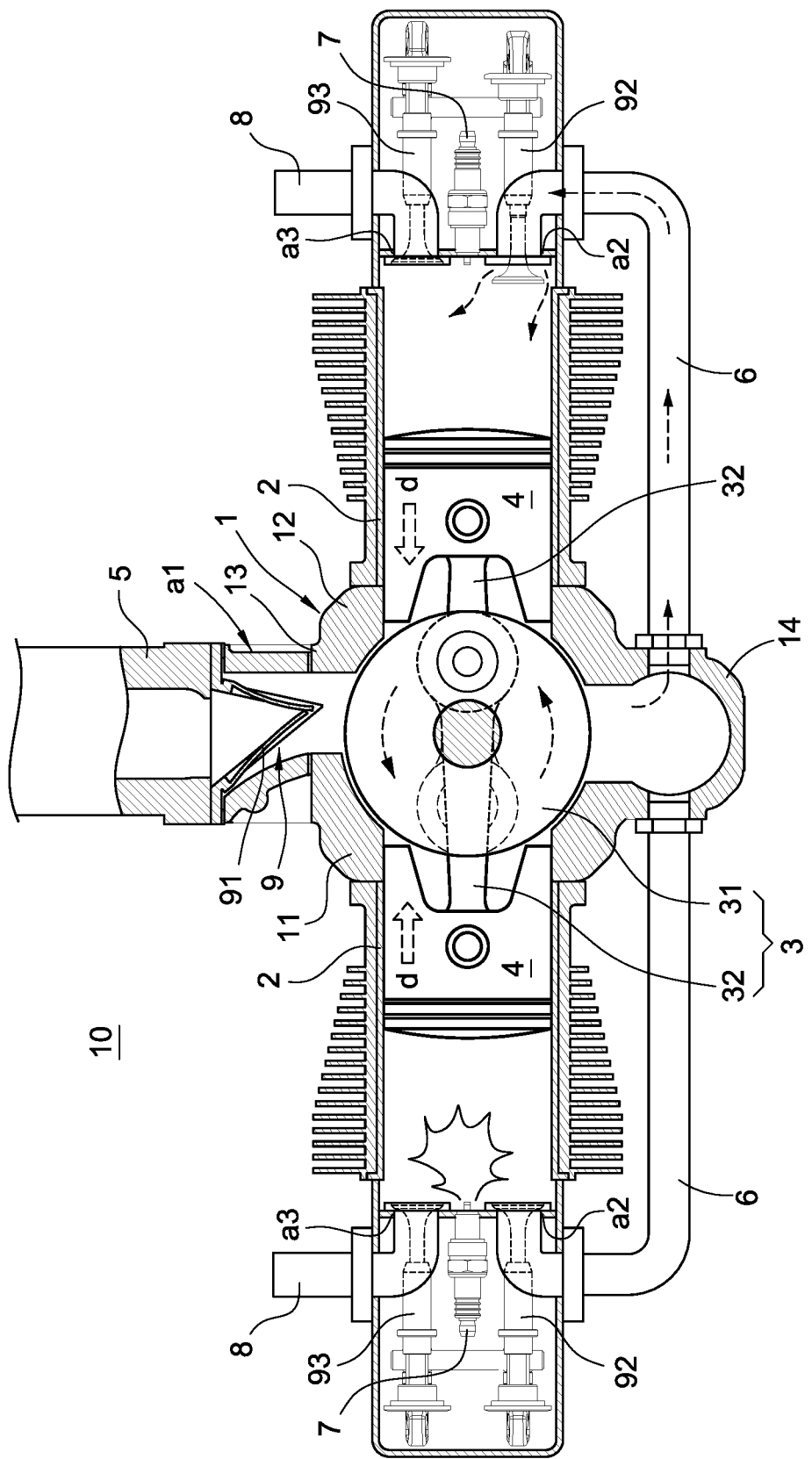
FIG. 3 is a schematic view showing a third operating status of the high-performance internal combustion engine according to one embodiment of the present invention.

As shown in FIG. 3, the third operating status is that: the spark plug 7 at the left side is ignited for enabling the cylinder chamber 2 at the left side to generate a combustion stroke, the first switch valve 92 and the second switch valve 93 both at the left side are closed during the combustion stroke, and a pressure generated during the combustion is able to apply a pushing force to the pistons 4, so that the two pistons 4 are together displaced towards the directions close to the crankshaft chamber 1, meanwhile the internal air pressure inside the crankshaft chamber 1 is increased so as to close the check valve 91, so that the combustion fuel, the air and the lubrication oil are prevented from flowing from the crankshaft chamber 1 to the inlet pipe 5, lastly the combustion fuel, the air and the lubrication oil are allowed to enter the cylinder chamber 2 at the right side via the first switch valve 92 at the right side for enabling an air intake stroke to be generated.

Figure 4:
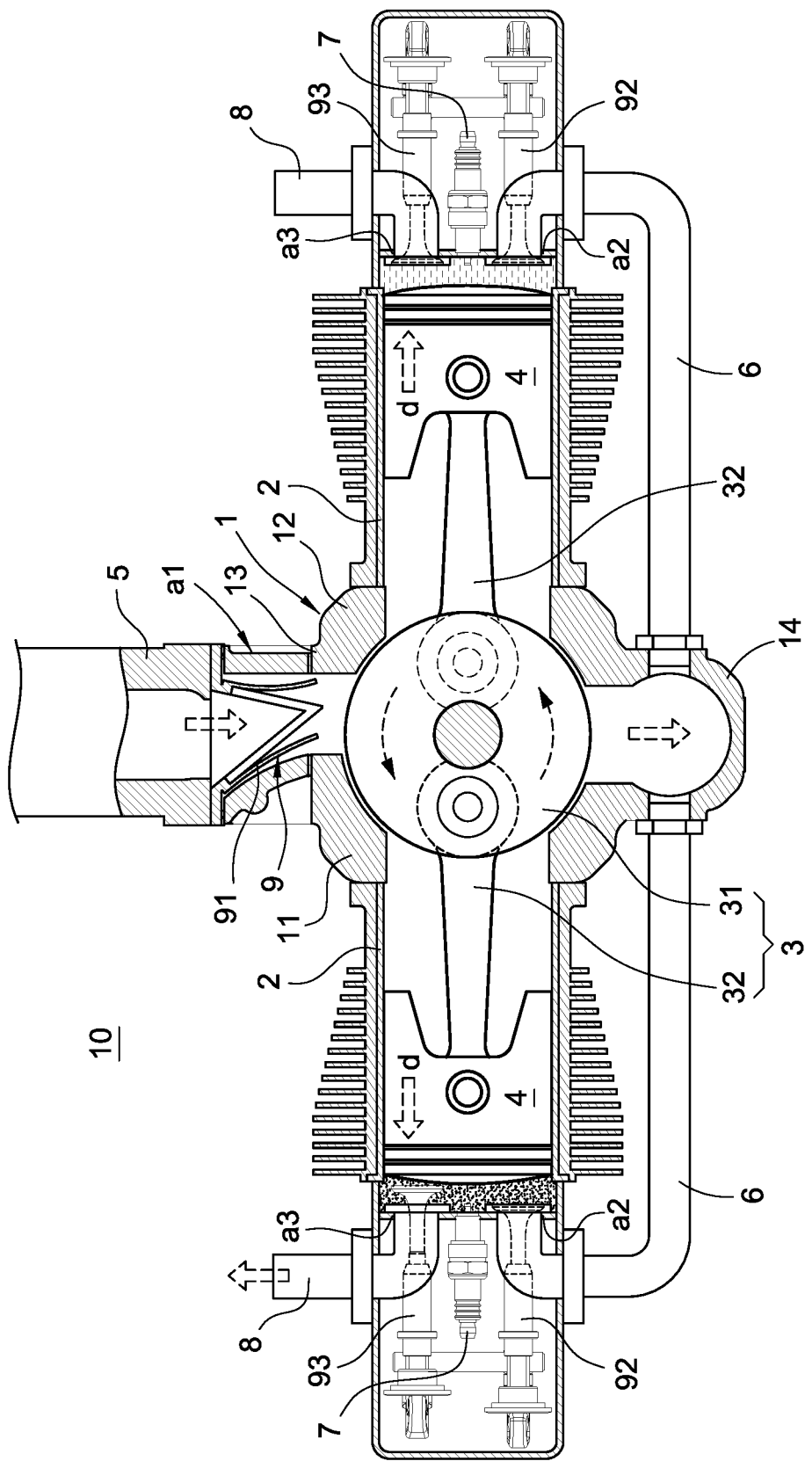
FIG. 4 is a schematic view showing a fourth operating status of the high-performance internal combustion engine according to one embodiment of the present invention.

As shown in FIG. 4, the fourth operating status is that: the two pistons 4 are together driven be to displaced towards the directions away from the crankshaft chamber 1, so that the internal air pressure inside the crankshaft chamber 1 is decreased so as to open the check valve 91, and the first switch valve 92 and the second switch valve 93 both at the right side are in a closed status, thereby enabling the interior of the cylinder chamber 2 at the right side to be in a sealed status, so when the piston 4 is continuously displaced to compress an internal space of the cylinder chamber 2 at the right side, the combustion fuel, the air and the lubrication oil are pressurized for enabling a pressurizing stroke to be generated; because the first switch valve 92 at the left side is in a closed status and the second switch valve 93 at the left side is in an opened status, waste gas generated during the combustion stroke inside the cylinder chamber 2 at the left side is exhausted from the second switch valve 93 at the left side to the exhaust pipe 8 at the left side thereby enabling an exhaustion stroke to be generated. Accordingly, as shown from FIG. 1 to FIG. 4, an operating process of a four-stroke cycle internal combustion engine is complete.

Moreover, as shown in FIG. 2 and FIG. 4, when the two pistons 4 are together displaced towards the directions away from the crankshaft chamber 1 till the two cylinder chambers 2 being fully compressed, an air intake amount of the crankshaft chamber 1 is equal to an air intake amount of the two cylinder chambers 2, but as shown in FIG. 1, when the two pistons 4 are together displaced towards the directions close to the crankshaft chamber 1 till the crankshaft chamber 1 being fully compressed, the air intake amount (the air intake amount of crankshaft chamber 1 as shown in FIG. 4) of the two cylinder chambers 2 is only filled inside the cylinder chamber 2 at the left side, so that the cylinder chamber 2 at the left side is provided with a pressurizing effect; with the same principle, as shown in FIG. 3, when the two pistons 4 are together displaced towards the directions close to the crankshaft chamber 1 till the crankshaft chamber 1 being fully compressed, the air intake amount (the air intake amount of crankshaft chamber 1 as shown in FIG. 2) of the two cylinder chambers 2 is only filled inside the cylinder chamber 2 at the right side, so that the cylinder chamber 2 at the right side is provided with a pressurizing effect. Accordingly, the combustion stroke of the cylinder chamber 2 is able to generate a greater combustion force, thereby increasing the power efficiency of the high-performance internal combustion engine 10.

Moreover, the inlet pipe 5 is only communicated with the crankshaft chamber 1, one end of the flow guiding pipe 6 is only communicated with the crankshaft chamber 1 and another end thereof is only communicated with the cylinder chamber 2, and the inlet pipe 5 is connected to the upper part 13, the two flow guiding pipes 6 are connected to the lower part 14, the combustion fuel, the air and the lubrication oil introduced from the inlet pipe 5 have to pass through the crankshaft chamber 1 so as to flow into the two flow guiding pipes 6, so that the combustion fuel, the air and the lubrication oil can be served to evenly lubricate the crankshaft disk 3 then flow into the two flow guiding pipes 6, thereby enhancing the operation stability of the crankshaft linkage mechanism 3 and prolonging the service life thereof, meanwhile the combustion fuel, the air and the lubrication oil sequentially flow through the inlet pipe 5, the crankshaft chamber 1, the flow guiding pipe 6 and the cylinder chamber 2, so that turbulent flows can be prevented from being generated inside the crankshaft chamber 1, the flow guiding pipe 6 or the cylinder chamber 2, and the working efficiency of the high-performance internal combustion engine 10 can be stabilized.

Figure 5:
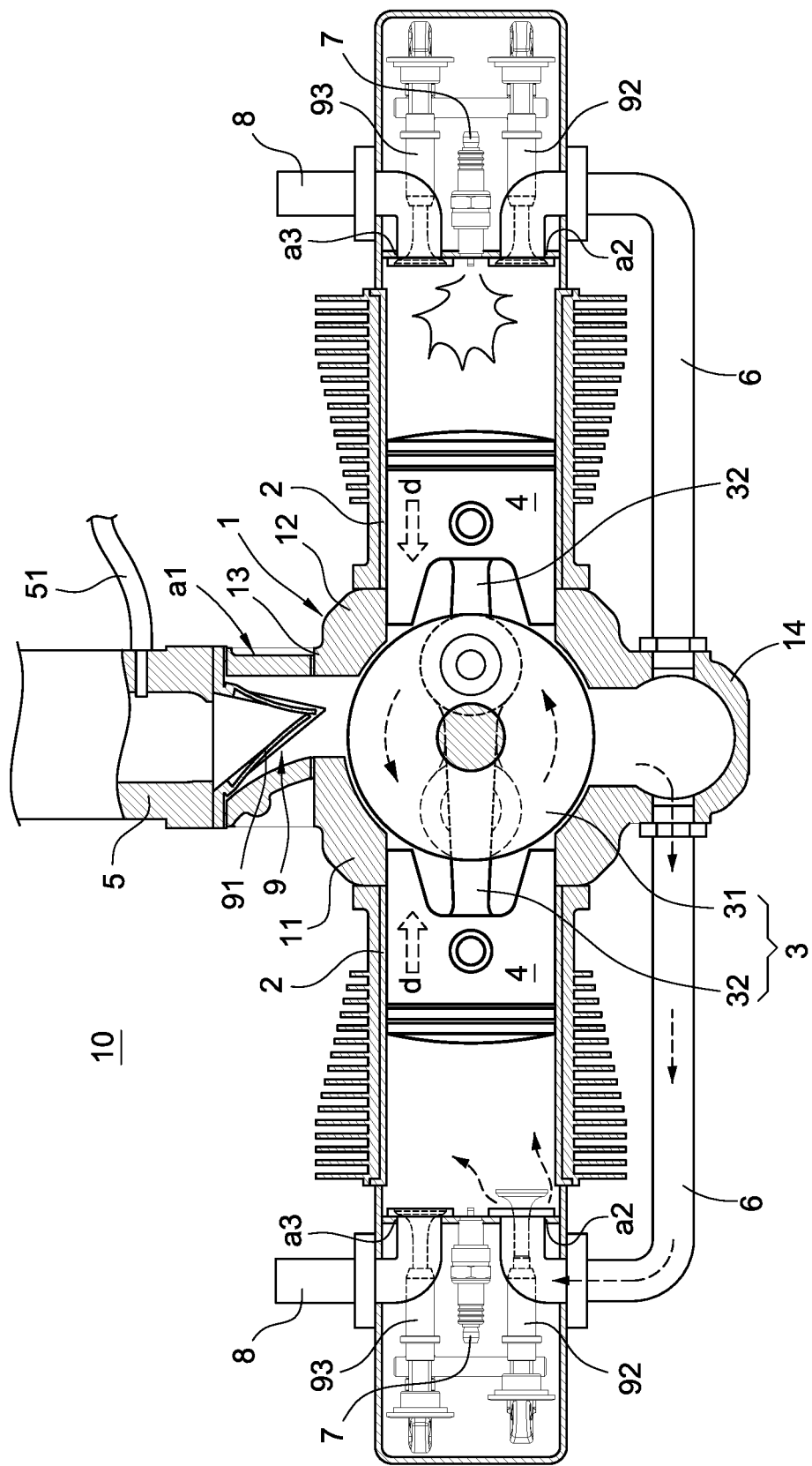
FIG. 5 is a schematic view showing an operating status of the high-performance internal combustion engine according to another embodiment of the present invention.

Please refer to FIG. 5, which is a schematic view showing an operating status of the high-performance internal combustion engine 10 according to another embodiment of the present invention. The embodiment disclosed in FIG. 5 is substantially the same as the embodiment disclosed from FIG. 1 to FIG. 4, the difference between the embodiment disclosed in FIG. 5 and the embodiment disclosed from FIG. 1 to FIG. 4 is that the high-performance internal combustion engine 10 further includes a lubrication oil nozzle 51.

Details are provided as follows. According to this embodiment of the present invention, the high-performance internal combustion engine 10 further includes the lubrication oil nozzle 51. The lubrication oil nozzle 51 is disposed in the inlet pipe 5 and arranged corresponding to an inner chamber of the inlet pipe 5. The inlet pipe 5 is used for introducing an external mixture of combustion fuel and air into the inner chamber of the inlet pipe 5, the lubrication oil nozzle 51 is used for guiding external lubrication oil into the inner chamber of the inlet pipe 5, lastly the combustion fuel, the air and the lubrication oil are mixed in the inner chamber of the inlet pipe 5 so as to flow into the crankshaft chamber 1. Accordingly, the same functions and effects as the embodiment disclosed from FIG. 1 to FIG. 4 can be achieved. Based on what has been disclosed above, the high-performance internal combustion engine 10 provided by the present invention is novel and more practical in use comparing to prior arts.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A high-performance four-stroke internal combustion engine, including: a crankshaft chamber; at least two cylinder chambers; a crankshaft linkage mechanism, disposed in the crankshaft chamber; at least two pistons, connected to the crankshaft linkage mechanism and accommodated in the cylinder chambers; an inlet pipe, only communicated with the crankshaft chamber; at least two flow guiding pipes, having one end thereof only communicated with the crankshaft chamber and another end thereof only communicated with the cylinder chamber; a check valve unit, including a check valve disposed at a connecting location of the inlet pipe and the crankshaft chamber, and at least two first switch valves disposed at connecting locations of the flow guiding pipes and the cylinder chambers, wherein there are two cylinder chambers, there are two pistons, there are two flow guiding pipes and there are two first switch valves, the crankshaft chamber is formed with a left part, a right part, an upper part and a lower part, one of the cylinder chambers is connected to the left part, the other cylinder chamber is connected to the right part, the inlet pipe is connected to the upper part, and the two flow guiding pipes are connected to the lower part, wherein a lubrication oil nozzle is disposed in the inlet pipe and arranged corresponding to an inner chamber of the inlet pipe, and wherein the inner chamber contains a gas mixture of fuel, oil, and air, and in which the gas mixture passes through the crank chamber from the inner chamber and into the two flow guiding pipes in the lower part of the crankshaft chamber.

2. The high-performance four-stroke internal combustion engine according to claim 1, wherein the crankshaft chamber and the cylinder chambers are separated by the pistons, the two pistons are together displaced towards directions close to the crankshaft chamber or displaced towards directions away from the crankshaft chamber, and displacement directions of the two pistons are arranged in parallel.

3. The high-performance four-stroke internal combustion engine according to claim 1, wherein the crankshaft linkage mechanism includes a crankshaft disk and at least two linkage rods, the crankshaft disk is disposed in the crankshaft chamber, and one end of linkage rod is connected to the crankshaft disk and another end thereof is disposed in the cylinder chamber, and the piston is connected to the linkage rod and capable of being reciprocally displaced inside the cylinder chamber with the linkage rod.

4. The high-performance four-stroke internal combustion engine according to claim 3, further including at least two spark plugs, wherein the spark plug is connected to one side, away from the crankshaft chamber, of the cylinder chamber, and arranged corresponding to the cylinder chamber.

5. The high-performance four-stroke internal combustion engine according to claim 4, further including at least two exhaust pipes, wherein the exhaust pipe is only communicated with the cylinder chamber, the internal combustion engine further includes at least two second switch valves, and the second switch valves are disposed at connecting locations of the exhaust pipes and the cylinder chambers.

6. The high-performance four-stroke internal combustion engine according to claim 5, wherein the flow guiding pipe and the exhaust pipe are disposed at two sides of the spark plug.

\* \* \* \* \*